Dec. 4, 1962 P. F. OLTON 3,066,578
TEMPERATURE CONTROL OF MACHINE TOOL
Filed Dec. 17, 1958 5 Sheets-Sheet 1

INVENTOR.
PETER F. OLTON.
BY
Howard Keiser
John F. Verhoeven
ATTORNEYS.

Dec. 4, 1962 P. F. OLTON 3,066,578
TEMPERATURE CONTROL OF MACHINE TOOL
Filed Dec. 17, 1958 5 Sheets-Sheet 2

INVENTOR.
PETER F. OLTON.
BY
Howard H. Keiser
John F. Verhoeven
ATTORNEYS.

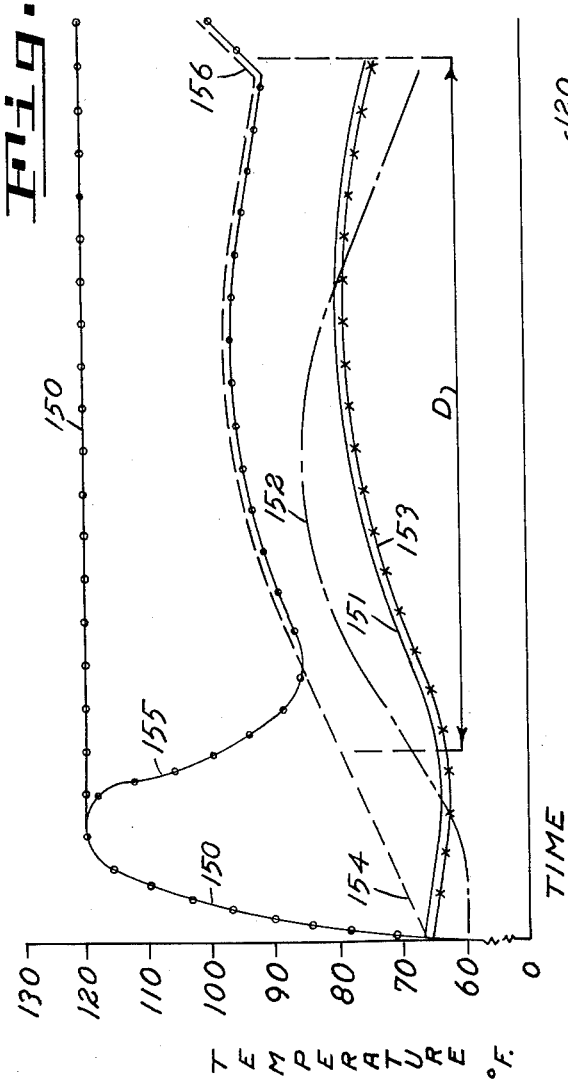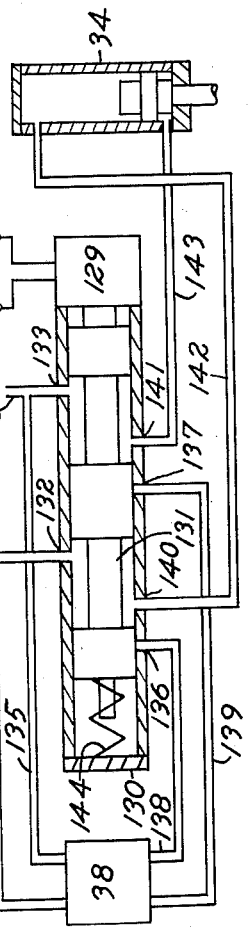

INVENTOR.
PETER F. OLTON.

Dec. 4, 1962

P. F. OLTON 3,066,578

TEMPERATURE CONTROL OF MACHINE TOOL

Filed Dec. 17, 1958

United States Patent Office 3,066,578
Patented Dec. 4, 1962

3,066,578
TEMPERATURE CONTROL OF MACHINE TOOL
Peter F. Olton, Cincinnati, Ohio, assignor to The Cincinnati Milling Machine Co., Cincinnati, Ohio, a corporation of Ohio
Filed Dec. 17, 1958, Ser. No. 781,149
13 Claims. (Cl. 90—11)

The present invention relates to temperature control of a machine tool during operation.

In a machine tool the temperatures during operation of the various portions of the machine tool can have an important influence on the accuracy of the work produced. If two different associated portions, such as the portion supporting the workpiece and the portion supporting the cutting tool, are positioned relative to each other to produce accurate work when both portions are at room temperature, the accuracy of the work will suffer if the portions heat up in different amounts during operation. This has been recognized heretofore and efforts have been made to maintain the machine at a constant temperature during operation of the machine tool. Because of the bulk of the machine tool it is often difficult to achieve this.

In the present invention no attempt is made to keep the respective temperatures of the portions constant during the operation of the machine tool. Instead, the temperatures of the portions of the machine are allowed to fluctuate but means is provided to produce a predetermined relation between the fluctuating temperatures of associated portions. These associated portions of the machine tool are designed to produce accurate work when this predetermined temperature relation has been established.

If the material of both portions is the same, so that an equal increase in the temperature of both portions will produce an equal increase in a given span of both portions, the fluctuating temperatures of the portions are controlled to maintain the difference between the temperatures thereof constant during operation of the machine. If the temperatures fluctuate during operation, they will fluctuate in unison, and since the dimensional change in both of the associated portions will be the same, these portions will remain in proper relative position for accurate work.

In the preferred embodiment of the invention the temperature controlled portions of the machine are controlled relative to a reference temperature which may be the temperature of a portion of the base of the machine, which temperature is relatively unaffected by operation of the machine and is influenced primarily only by room temperature. This reference temperature, although fluctuating in response to room temperature changes, is relatively stable and provides a convenient reference for the operation of thermostatic means to establish a predetermined temperature difference between this reference temperature and the respective portions of the machine. Since the temperatures of these portions are controlled relative to a common reference temperature, they will bear a predetermined relation to each other; and since this reference temperature is taken in the base of the machine these portions will have a predetermined temperature relation with the base and all portions of the machine having the same temperature as the base without the necessity of having to control the temperature of the base or control the temperature of other portions unaffected by heat generated during the operation and having the same temperature as the base.

Since accuracy of work within desired tolerance limits will be achieved only when the temperature difference between the portions is within predetermined limits, and since temperature correlation between the portions is not instantaneous, preferably means is provided to indicate, or signal, that the temperature difference between the members is at, or within tolerance limits of, the predetermined temperature difference for which the portions were designed so that cutting operations will be performed only when the proper temperature relation between the associated portions exists. This signal may be utilized to disengage automatically the cutting tool from the workpiece.

It is therefore an object of the present invention to provide a temperature control system to produce a predetermined temperature relation between associated portions of a machine tool having temperatures tending to fluctuate during operation to permit accurate operations on a workpiece after said relation has been established.

It is another object of the present invention to control the temperatures of associated portions of a machine tool relative to a reference temperature.

It is another object of the present invention to disable the machine tool when the difference between the temperatures of associated members depart from the predetermined temperature difference for which the portions were designed.

It is a further object of the present invention to maintain portions of the machine at a predetermined temperature relation during operation without the necessity of supplying heat to, or removing heat from, the major portion of the machine.

It is still another object of the present invention to provide a simple, effective, heat control system particularly suitable for large machine tools.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

FIG. 5 is a schematic diagram of the signal operated mechanism to disable the machine tool when a proper temperature relation between portions of the machine does not exist;

FIG. 6 is a graph showing the temperature relation of portions of the machine;

Figure 1:
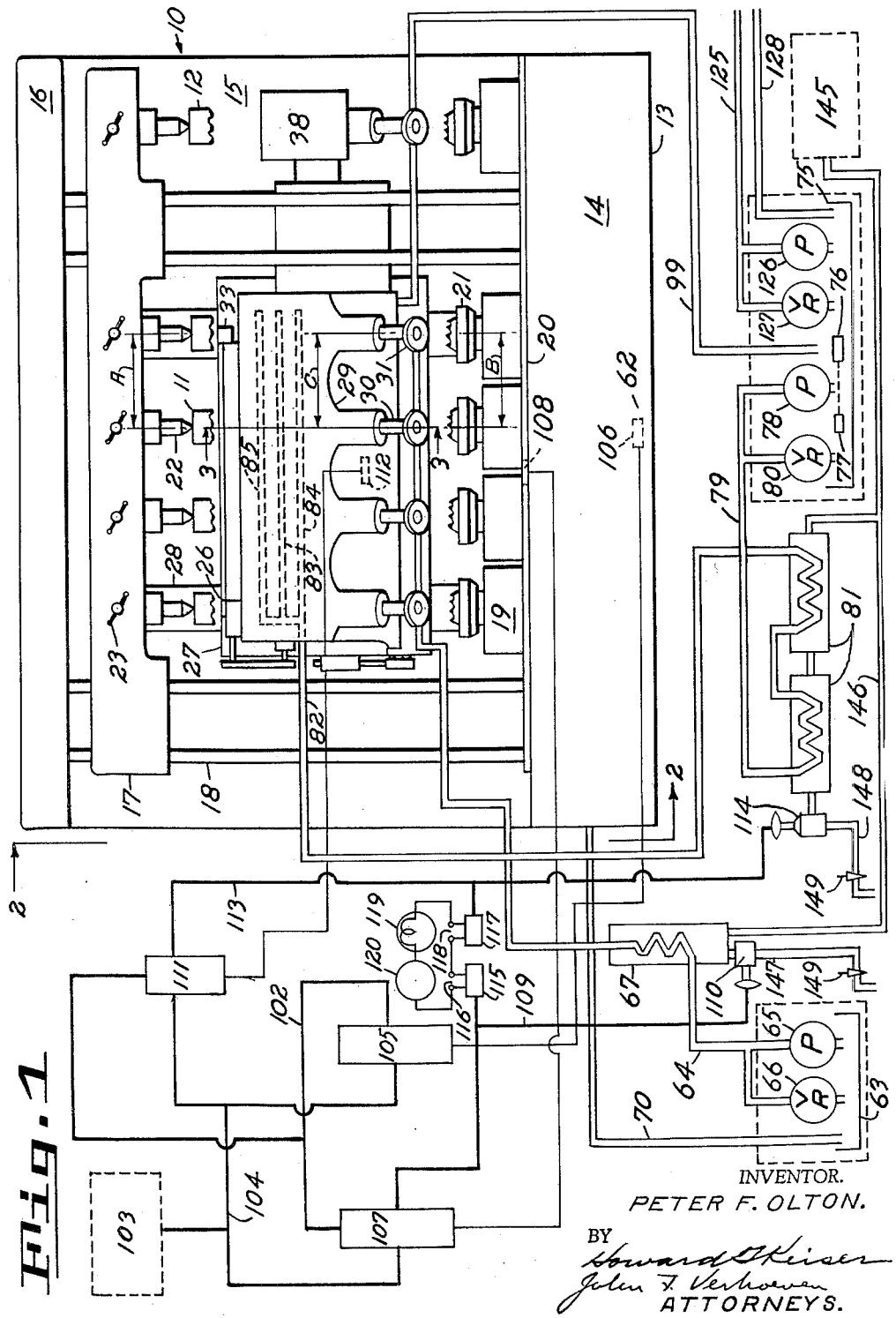
FIG. 1 is a front elevational view of a machine tool and a schematic diagram of the temperature control system therefor.

The present invention is illustrated in conjunction with a tracer controlled four-spindle milling machine 10, as shown in FIG. 1, operable to form four like workpieces 11 in conformity with a master 12. The machine has a base 13 with a lower portion 14, an upstanding portion 15, and an upper portion 16 extending over the lower portion. A tailstock member 17 is mounted on vertical rails, or ways, 18 extending between the upper and lower base portions and is vertically adjustable thereon by a power driven screw (not shown), or other suitable means. Table members 19 are mounted on a bed plate 20 carried by the lower portion 14 of the base, and the tables have a motor driven rotatable headstock 21 which support the lower ends of the workpieces 11 and master 12. The upper ends of the workpieces 11 and master 12 are supported by spindles 22 depending from the tailstock and adjustable by handles 23.

Figure 2:
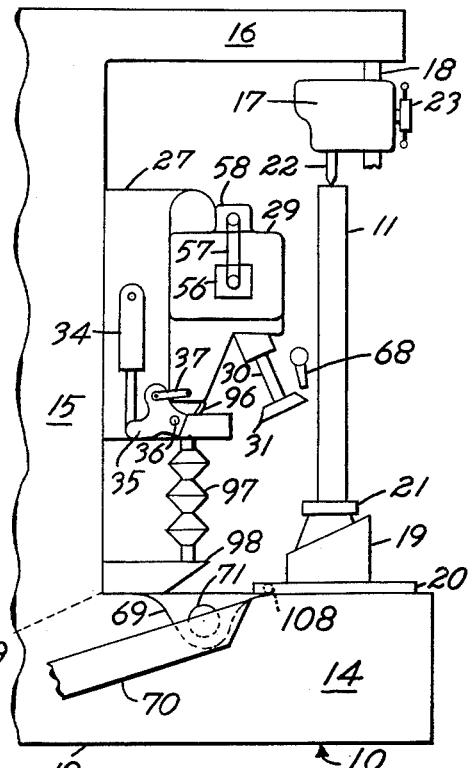
FIG. 2 is a view taken on the line 2—2 of FIG. 1.

A saddle 27 is mounted for vertical movement by a hydraulic motor (not shown) on ways 28 of the upstanding portion 15 of the base. A housing 29, in which are received the shafts 30 carrying the cutting tools 31, is suspended from a shaft 32 (see FIG. 3) rotatably mounted on the saddle between fixed bearing 33 and a floating bearing 26. As shown best in FIG. 2, a hydraulic cylinder 34 is pivotally mounted on the saddle 27 and is connected by lever 35, pivotally connected to the saddle at 36, and link 37 to housing 29 to swing the housing, and hence the cutting tools 31, relative to the workpiece. A tracer mechanism 38 is connected to an extending portion of the housing for engagement with the master 12 when the cutting tools are in engagement with the workpieces 11. The tracer mechanism controls the operation of the headstock motors (not shown) and the motor 34, while the vertical feed motor is controlled to move the saddle vertically a predetermined amount for each revolution of the headstocks.

Figure 3:
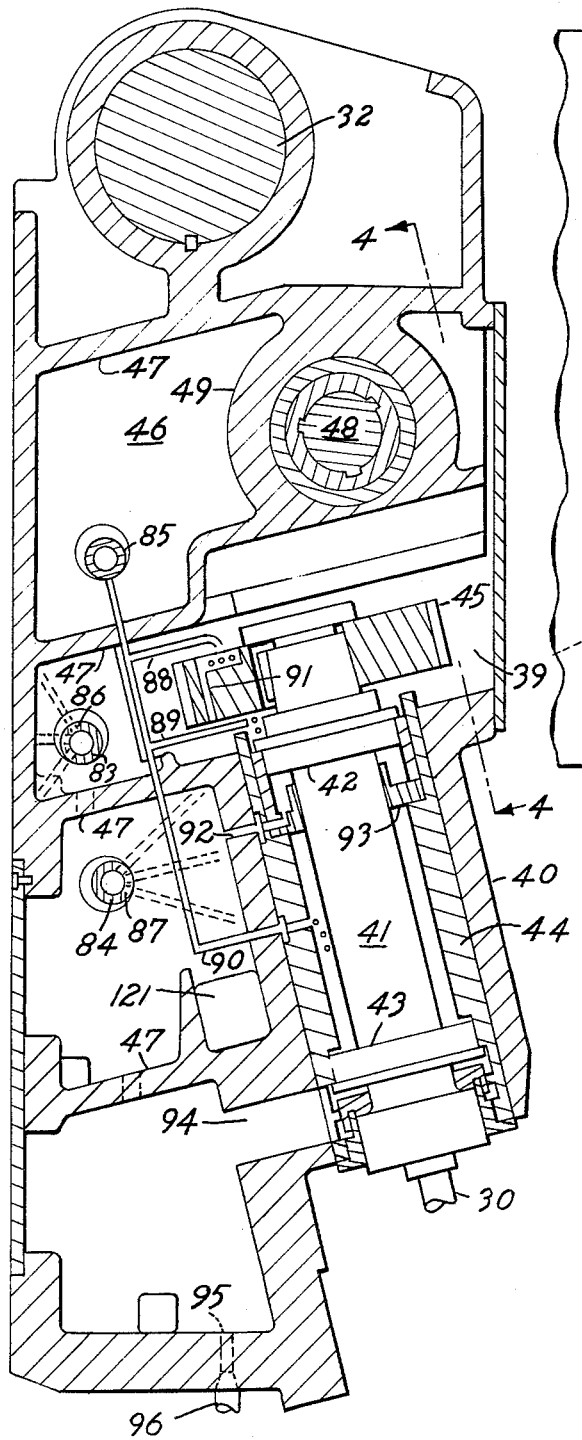
FIG. 3 is a view taken on the line 3—3 of FIG. 1.
Figure 4:
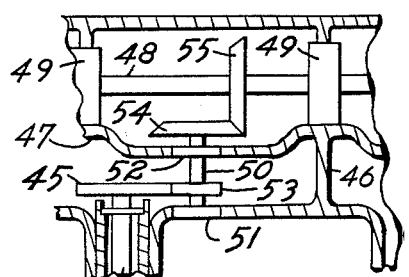
FIG. 4 is a view taken on the line 4—4 of FIG. 3.

As shown in FIG. 3, the cutting tool shafts 30 are received in spindles 41, which are mounted for rotation in anti-friction bearings 42 and 43 in sleeve 44. The sleeve 44 is snugly received in a cylindrical portion 40 of the housing 29, and the spindles 41 each have a spur gear 45 secured on the inner end thereof within the housing compartment 39. The housing compartment has spaced vertical webs 46 and spaced cross webs 47. The spindles 41 are driven by a shaft 48 extending horizontally across the housing and supported in hubs 49 integral with the vertical webs 46. As shown in FIG. 4, a shaft 50 is rotatably received in anti-friction bearings 51 and 52, mounted in the wall of the housing and one of the cross webs 47, and has a spur gear 53 thereon in engagement with spur gear 45. The shaft 50 has a bevel gear 54 at its inner end engaged with bevel gear 55 on shaft 48. The shaft 48 is driven through gear box 56 and chain 57 by motor 58 mounted on the housing 29 (see FIG. 2).

During the cutting operation, the housing 29 will be subjected to heat generated incident to the rotation of the cutting tool by the mechanism through which the tool is rotated. The amount of heat generated will depend primarily on the speed of the cutting tool and the load encountered thereby and, if not dissipated, would tend to cause a fluctuating temperature in the housing. The bed plate 20 and the tables 19 are also subjected to heat, primarily from the hot chips dropping thereon, and the temperature of these members, if no effort were made to remove this heat, would tend to fluctuate during operation, but in different amounts than the housing temperature would tend to fluctuate. As will be described hereafter, the temperature of the members 20 and 19 supporting the workpieces are maintained at the same temperature as a reference temperature, which is preferably the temperature of a portion 62 of the base spaced from the portions of the machine heated during operation. This reference temperature is influenced primarily only by the room temperature, and, although it will fluctuate in response to room temperature changes, the fluctuation will not be abrupt because of the mass of the machine.

The temperature of the housing 29 is maintained at a temperature bearing a predetermined relation to the reference temperature, say, for example, 15° F. above the reference temperature. Since the temperature of the members supporting the workpiece are maintained in predetermined relation to the reference temperature, that is, at the same temperature, and since the temperature of the member carrying the cutting tools is maintained at a predetermined temperature relation to the reference temperature, that is, 15° F. above that reference temperature, these respective associated members must be designed so that they will be properly positioned relative to each other for accurate cutting when these predetermined relations are established. Thus, when the temperature of the housing 29 is 15° F. above the temperature of the members supporting the workpieces, the distance A between the spindles 22 of the tailstock, the distance B between the headstocks 21 on the tables 19, and the distance C between the centers of the cutting tools will be the same.

In the particular machine described herein, the tailstock member 17 is sufficiently spaced from the cutting operation so as not to be significantly affected by heat generated thereby. As a result the temperature of the tailstock tends to fluctuate at the same temperature as the portion 62 of he base, and no means need be provided to control the tailstock temperature. The temperature of the bed plate 20 and tables 19 are controlled by means of a heat exchanging medium, which may be the cutting fluid circulated thereover during the cutting operation. As shown in FIG. 1, the cutting fluid is pumped from a sump 63 into line 64 by pump 65. Pressure in line 64 is established by relief valve 66. Line 64 passes through heat exchanger 67 and terminates in nozzles 68 (see FIG. 2) adjacent the cutting tools 31. The cutting fluid is directed at the workpieces and cutting tools, flows onto the tables 19, bedplate 20, and into the trough 69 in the base. The cutting fluid is conveyed from trough 69 into conduit 70 by screw 71 and flows by gravity back to the sump.

The heat exchanging medium which is used to maintain the temperature of the housing 29 at its proper temperature relation to the reference temperature may be the hydraulic oil which is used to operate the hydraulic mechanisms of the machine. This oil is maintained at a predetermined temperature of say 120° Fahrenheit in the sump 75 by an electric heating unit 76 controlled by the thermostatic switch 77. The oil is delivered by pump 78 to line 79, and the pressure in that line is established by relief valve 80 discharging to the sump. The line 79 passes through heat exchanger 81 and is connected, through a flexible portion 82, to pipes 83, 84, and 85 extending through the housing. As shown in FIG. 3, pipes 83 and 84 have a plurality of small openings 86 and 87 so that oil therefrom will spray the walls within the interior of the housing, the oil from pipe 83 spraying the rear wall of the housing, and the oil from pipe 84 spraying the cylindrical portion 40 receiving the spindle mechanism. The oil in pipe 85 is used to lubricate the gears and bearings of the drive mechanism. Oil from pipe 85 passes through branch line 88 onto spur gear 45, through branch line 89 onto bearing 42, and through branch line 90 onto bearing 43. The oil from the line 88 flows into passage 91 in spur gear 45 and back into compartment 39. The oil from branch line 89 flows into a passage 92 passing through the ring 93 encircling the spindle, through the wall of sleeve 44, and through the wall of housing portion 40, and connecting into compartment 39. The oil from passage 90 flows into a passage 94 passing through a slot in sleeve 44 and housing portion 40 and connecting into compartment 39. The webs 46 and 47 have openings to permit the oil to drain through the compartment 39 to outlet 95. A flexible hose 96 connects outlet 95 to an expandable sleeve 97 (see FIG. 2) fastened to the saddle and connected to trough 98. Oil flows by gravity in trough 98 back to the sump 75. This return for the hydraulic oil is shown schematically on FIG. 1 as conduit 99.

With this circulation of cutting fluid and hydraulic oil it will be seen that the temperatures of the workpiece supporting tables 19 and the housing 29 supporting the cutting tool will be brought to the temperatures of the respective heat exchanging media circulated therethrough. The temperatures of the cutting fluid and hydraulic oil are established by the heat exchangers 67 and 81, respectively, which are controlled by pneumatically operated thermostats. A source 145 of cooling medium which may be well water or any conventional cooling medium is connected to the heat exchangers by line 146. Discharge of cooling medium from heat exchanger 67 occurs through line 147 and from heat exchanger 81 through line 148. Manual valves 149, located in lines 147 and 148, remain open during operation of the machine.

Figure 9:
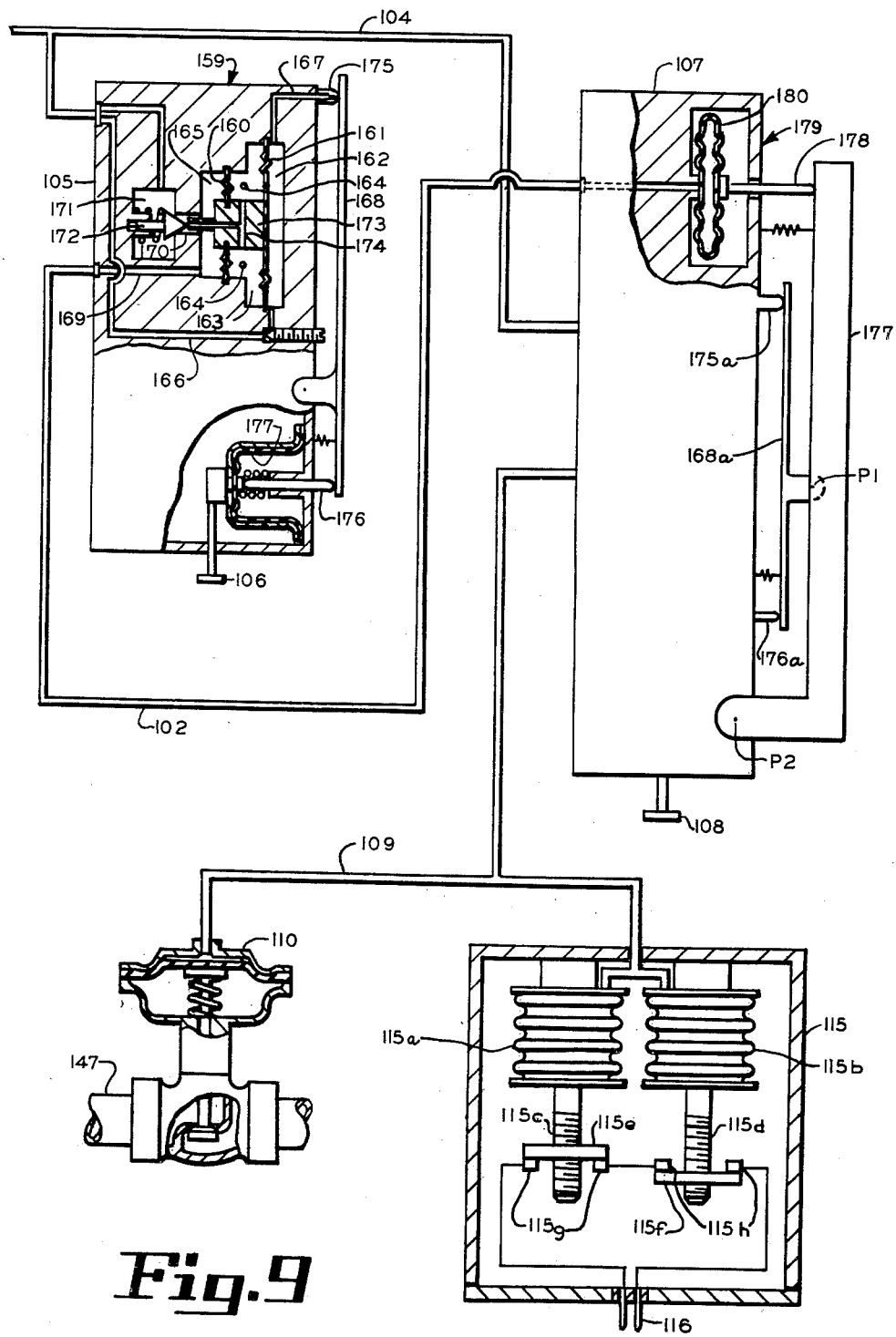
FIG. 9 is a schematic representation of some of the elements of the temperature control system.

As shown in FIG. 1, a source of air pressure 103 supplies a constant pressure to supply line 104, to which is connected a reference thermostat 105 having a bulb 106 in the base at portion 62 to sense the temperature thereof. The outlet pressure of the thermostat is a function of the base temperature and will vary as the base temperature varies, increasing as the base temperature rises, and decreasing as the base temperature falls. The thermostat 105 is a commercially available unit and may be similar to the direct acting master thermostat T-900 of The Johnson Service Company of Milwaukee, Wisconsin. The unit 105 is shown schematically in FIG. 9. The thermostat has a pneumatic relay 159, which may be similar to that shown in U.S. Patent 1,500,260, and comprises a cavity in the body of the thermostat divided by two flexible diaphragms 160, 161, into three chambers, a forward chamber 162, an intermediate chamber 163 which is ported to atmosphere at 164, and a rear chamber 165. Forward chamber 162 has an adjustably restricted inlet passage 166 connected to supply line 104, and an outlet passage 167 variably restricted by arm 168. Rear chamber 165 has an outlet passage 169, and an inlet passage 170 which is connected to a chamber 171 in communication with supply line 104. A valve member 172 is mounted in chamber 171 and is normally urged to block passage 170. A fitting 173, carried by diaphragm 160 and abutting against diaphragm 161, has a portion extending through chamber 165 and loosely received in passage 170. This fitting portion is adapted, when moved in the appropriate direction (to the left in FIG. 9), to unseat the valve member 172 by engagement therewith and open passage 170. The fitting 173 has a passage 174 which is in communication with ports 164 of chamber 163 and which is blocked when fitting 173 is moved into engagement with valve member 172. When the fitting 173 is not engaged with valve member 172, chamber 165 is connected by the passage 174 in the fitting to the atmosphere ports 164. In operation, the air in chamber 162 will assume a pressure depending on the spacing of arm 168 from leak port 175 at the end of passage 167. The relationship between the pressures iin chambers 162 and 165 will determine the movement of fitting 173. When the fitting moves to the left to block passage 174 and open passage 170, air from supply pressure line 104 is admitted to chamber 165 and the pressure is increased in that chamber. When the fitting 173 moves to the right to close passage 170 and open passage 174, the pressure in chamber 165 is decreased. Thus, the pressure in chamber 165 bears a predetermined relationship to the pressure in chamber 162. The arm 168, which has one end adjacent leak port 175 to control the pressure in chamber 162, is pivotally connected at an intermediate point to the body of the thermostat 105. The opposite end of the arm 168 is biased into engagement with plunger 176. Vapor pressure from bulb 106 is transmitted through a capillary tube to expand bellows 177 when the temperature rises and extend plunger 176. This pivots arm 168 to increase the pressure in chamber 162 and to increase, accordingly, the pressure in chamber 165, which constitutes the outlet pressure of thermostat 105. The outlet pressure from thermostat 105 is fed to a pilot pressure line 102. Another thermostat 107, which may be similar to The Johnson Service Company direct acting submaster thermostat T-901, is connected to the supply line 104 and the pilot pressure line 102, and has a bulb 108 in the bed plate 20 to sense the temperature at the bed plate 20 and tables 19 which support the workpiece. The thermostat 107 has a pneumatic relay with a leak port 175a, which may be similar to the pneumatic relay 159 of thermostat 105, and has a plunger 176a which extends or retracts, in response to a temperature rise or drop, respectively, at bulb 108 in the same manner plunger 176 responds to temperature fluctuation of bulb 106. An arm 168a, pivotal about an intermediate point P1, is biased so that the end opposite leak port 175a is engaged with plunger 176a. The arm 168a, however, is not pivoted on the thermostat body but, instead, is pivotally mounted on a second arm 177 which is pivotally connected, at P2, to the thermostat body. The arm 177 is biased against plunger 178 of a fluid pressure operated device 179, which may be similar to the device shown in U.S. Patent 2,523,213. The device 179 has an expandable bellows 180 connected to the pilot pressure line 102, and the plunger 178 extends or retracts in response to a pressure rise or drop, respectively, in pilot pressure line 102. The pressure in outlet line 109 of the pneumatic relay of thermostat 107 is controlled by the spacing of arm 168a from leak port 175a in the same manner as the pressure in line 102 is controlled by the spacing of arm 168 from leak port 175. As the temperature at bulb 108 increases to extend plunger 176a, the upper end of arm 168a tends to close leak port 175a, but as the temperature at bulb 106 increases (to increase the pressure in pilot line 102 and extend plunger 178) the arm 177 swings away from thermostat body 107 to tend to swing the upper end of arm 168a away from the leak port. The arms are pivotally connected so that equal temperature changes at bulbs 106 and 108 produce no change in the spacing of the upper end of arm 168a from leak port 175a. Thus, the outlet pressure of thermostat 107 is a function of both the temperature at the bed plate and the pilot pressure in line 102, which is a function of the reference temperature. If the temperature sensed by bulb 108 drops relative to the reference temperature, the spacing between the upper end of arm 168a and leak port 175a increases and the outlet pressure, which is fed to control pressure line 109, decreases. This regulates the normally closed pressure operated valve 110 in water line 147 to decrease the flow of water through heat exchanger 67. Conversely, if the temperature at the tables 19 rises relative to the reference temperature, the spacing between the upper end of arm 168a and leak port 175a decreases, the outlet pressure of thermostat 107 increases, and valve 110 is regulated to increase the flow of water and cool the cutting fluid, to bring the temperature of the tables to the same temperature as the reference temperature in base portion 62. It will be understood that a normally open valve, in lieu of the normally closed valve 110, may be used in conjunction with a submaster thermostat which has an outlet pressure connected to the valve which decreases as the temperature sensed by the submaster thermostat rises relative to the reference temperature.

Another thermostat 111, similar to thermostat 107, has a bulb 112 located in a cavity 121 in the housing 29 to sense the temperature therein. Thermostat 111 is connected to the pressure supply line 104 and the pilot pressure line 102 to produce an outlet pressure which is a function of the pilot pressure (and therefore the reference temperature) and the temperature in the housing. This pressure, which is fed to control line 113, decreases as the temperature in the housing 29 drops relative to the reference temperature and increases as the housing temperature rises relative to the reference temperature. The pressure in control line 113 controls the pressure operated normally closed valve 114 in line 148 to decrease the circulation of water through the heat exchanger when the pressure in line 113 drops and to increase the circulation of water therethrough when the pressure in that line rises. Thus, the temperature of the hydraulic coil circulating through the housing 29 is controlled to maintain the temperature of the housing at a predetermined relation to the reference temperature.

A switch 115 is operated in response to the pressure in line 109 and has terminals 116 which are connected when the pressure in that line is between predetermined amounts. The switch 115 has two pressure operated bellows 115a and 115b connected to line 109. The bellows have threaded stems 115c, 115d, respectively, which receive axially adjustable contact plates 115e, 115f. The contact plates, which are circular, are adapted to engage, respectively, two pairs of fixed contacts 115g, 115h connected in series between terminals 116. One set of contacts 115g is normally open (that is, are open when the pressure in bellows 115a is below a first predetermined level) and closes when the pressure in line 109 reaches that predetermined level; the other set of contacts 115h is normally closed (that is, are closed when the pressure in bellows 115b is below a second predetermined level) and opens when the pressure reaches that predetermined level which is above the pressure which operates the first set of contacts. Thus both sets of contacts will be closed and terminals 116 will be connected when the pressure in line 109 is within predetermined limits; and one or the other set of contacts will be open and terminals 116 disconnected when said pressure is above or below those limits. Since the pressure in line 109 is a function of the temperature of bed 20 and the reference temperature at 62, the contacts of switch 115 are set to connect terminals 116 when the desired predetermined temperature relation between the bed and the reference temperature is established. A similar switch 117 having terminals 118 is connected to control line 113 and is operated in response to pressure in that line. When the temperature of the housing and the reference temperature are in the desired predetermined relation, the terminals 118 are connected, and if a temperature difference from the desired relation exists beyond the limits for which the contacts are set, the terminals 118 are disconnected. A signal light 119 is connected in series with a source of electrical energy 120 and terminals 116 and 118 for energization when both the temperature at the housing 29 and the temperature at the workpiece supporting tables 19 are at their proper predetermined relation to the reference temperature at 62, and hence are in proper temperature relation to each other.

In lieu of operating a signal light, the switches 115 and 117 may operate control means to disable automatically the machine tool when either or both of the temperatures are not in proper relation to the reference temperature, as shown in FIG. 5. Hydraulic oil from sump 75 is delivered under pressure to line 125 by pump 126, the pressure in line 125 being determined by relief valve 127, and discharge line 128 provides a return to sump 75. When both pair of terminals 116 and 118 are connected, the solenoid 129 of valve 130 is energized to shift the valve member 131 to the left of the position shown, and pressure port 132 and discharge port 133 are blocked. Pressure is supplied through branch pressure line 134 to the tracer valve mechanism 38 and discharge therefrom is returned to line 128 by line 135. The tracer mechanism 38 is connected to ports 136 and 137 of valve 130 by lines 138 and 139, respectively. With the valve member 131 to the left, the port 136 is in communication with port 140, and port 137 is in communication with port 141. Ports 140 and 141 are connected to the ends of hydraulic motor 34, through lines 142 and 143, respectively, so that when the proper temperature relation exists, and solenoid 129 is energized, tracer mechanism 38 is connected through valve 130 to motor 34 and the motor is automatically controlled thereby. When, however, either the temperature of the housing or the temperature of the tables, or both, depart from the predetermined temperature relation with the base temperature, solenoid 129 is deenergized, and spring 144 shifts valve member 131 to the position shown. At that time, the ports 136 and 137 connected to the tracer mechanism are blocked, and pressure is supplied directly from port 132 through the valve and line 142 to operate motor 34 and swing the housing to disengage the tool from the workpiece. Exhaust from the motor passes through line 143, valve 130, and to return line 128.

When the machine is first started up, all portions of the machine will be at approximately the same temperature, which will be at or near room temperature as shown on the graph of FIG. 6. The oil in sump 75 will be heated by heater 76 to 120° F. and maintained at that temperature as shown by line 150. The temperature of the base portion 62, indicated by 151, will fluctuate, primarily under the influence of room temperature, which is indicated at 152. The temperature of the tables 19 and bed plate 20, indicated at 153, will be maintained at the same temperature as the base portion 62 by virtue of the cutting fluid flowing thereover, the temperature of which (not shown on graph) is regulated by heat exchanger 67 and thermostat 107 to maintain this temperature relation. When the temperature of the tables 19 and bed plate 20 are substantially the same temperature as the reference temperature, terminals 116 will be connected. The lines 151 and 153 on the graph are separated slightly for clarity.

The oil from sump 75 circulates through the housing 29 and increases the temperature thereof, indicated by line 154. As the housing temperature rises relative to the base temperature, the temperature 155 of the oil from sump 75 passing through heat exchanger 81 begins to drop, in response to operation of thermostat 111, and this oil establishes the temperature of the housing at a predetermined 15° F. above the reference temperature, and hence at a predetermined 15° F. above the temperature of the tables 19 and bed plate 20. The temperature 150 of the oil in sump 75 is held at 120° F. throughout the operation of the machine. When the temperature of the housing 29 is brought up to or near 15° F. above the reference temperature, terminals 118 are connected and, if terminals 116 are already connected, the light 119 will be energized, or the solenoid 129 will be energized, so that cutting may begin. If work within tolerance limits can, for example, be performed when the temperature difference between the work supporting members 20 and the tool carrying members 40 is within 2° of the predetermined temperature difference of 15° F. for which the associated portions were designed, the switches 115 and 117 may be set so that their respective terminals will become disconnected when the temperature difference between either of the members and the reference temperature departs more than one degree from its predetermined relation, thereby assuring that both terminals 116 and 118 will not be connected if the temperature difference between the associated portions is below 13° F. or above 17° F. As indicated by arrow D, cutting may continue as long as the appropriate temperature relations are maintained. If, at any time, the temperature of the housing 29, for example, should rise, as at 156, because of some failure in the system, the terminals 118 will be disconnected. Similarly, if the temperature of the tables 19 should rise or fall to depart from its predetermined desired relation with the reference temperature, and hence from its desired relation with the housing temperature, terminals 116 will be disconnected and work will cease.

In the preferred embodiment of the invention described herein the predetermined temperature difference between the base portion 62 and the tables 19 is zero so that no heat from the tables is transmitted to the base portion 62, although it will be understood other convenient temperature relations may be used. It is undesirable, however, to allow any significant amount of heat from the operation of the machine to affect the reference temperature since this would result in a constantly rising reference temperature and, therefore, constantly rising temperatures of the associated portions of the machine tool. A temperature difference between the housing 29 and the reference temperature of the base portion 62, such as 15° F., is preferred so that a relatively high temperature cooling medium for heat exchanger 81, such as well water, may be effectively used and so that air circulating about the housing will have some cooling effect thereon. It will be understood, however, that other temperature differences, including zero difference, could be used. Because the housing 29 is merely suspended from the saddle 27 virtually no heat is transmitted from the housing 29 to the base portion 62 despite the 15° F. difference therebetween.

Figure 7:
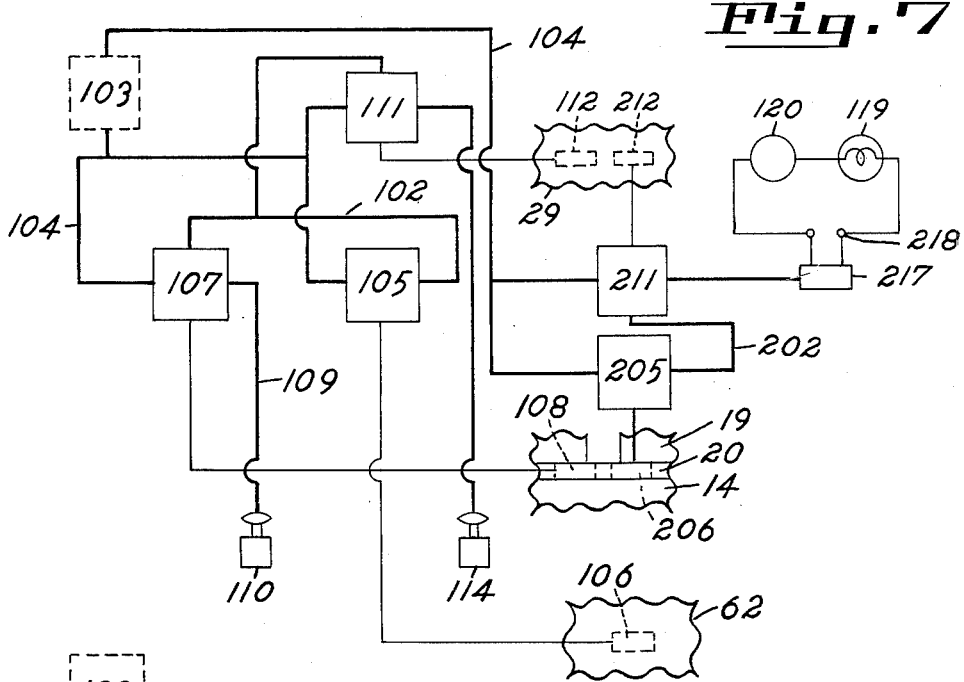
FIG. 7 is a schematic diagram of a modified signaling system.

In the preferred embodiment of the present invention the signal determining the energization of lamp 119 or solenoid 129 is controlled in response to means measuring the temperature difference between the base portion 62 and each of the associated portions 29 and 20, thereby indirectly measuring the temperature difference between the associated portions. As shown in FIG. 7 the signal may be controlled in response to means measuring the difference between the associated portions directly. In this embodiment the temperatures of the associated portions may be controlled in the same manner as shown in FIG. 1 with the valves 110 and 114 controlled, respectively, by thermostats 107 and 111. A master thermostat 205, which may be similar to master 105, has a bulb 206 embedded in bed plate 20 and a submaster 211, which may be similar to submaster 111, has a bulb 212 in the housing 29. Both thermostats 205 and 211 are connected to supply line 104 and the outlet pressure of master 205 is fed to submaster 211 through line 202. The outlet pressure of submaster 211, which is a function of the temperatures at housing 29 and bed plate 20, is supplied to switch 217, similar to switch 117. Terminals 218 of switch 217 are connected when the temperature difference between the housing 29 and bed plate 20 is a predetermined amount, energizing lamp 119 or solenoid 129.

Figure 8:
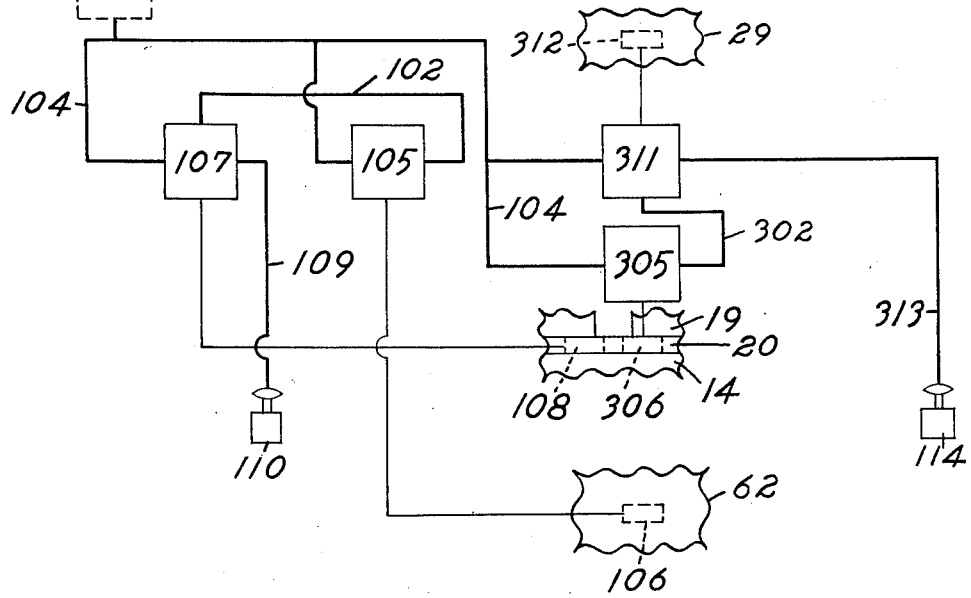
FIG. 8 is a schematic diagram of a modified control system.

In the preferred embodiment of the present invention the temperature of each of the associated portions 29 and 20 is controlled relative to the temperature of the base portion 62. As shown in FIG. 8 the temperature of one of the associated portions, say the bed plate 20, may be controlled relative to the reference temperature of base portion 62 while the temperature of the other portion 29 may be controlled relative to said one portion 20. As shown in FIG. 8 valve 110, which controls the flow of coolant to the heat exchanger 67 associated with bed plate 20, is controlled by the outlet pressure of thermostat 107 which is a function of the temperatures at base portion 62 and at bed plate 20 as in the system of FIG. 1. A master thermostat 305 has a bulb 306 in bed plate 20 and submaster thermostat 311 has a bulb 312 in housing 29. Both thermostats are connected to supply line 104 and the pressure outlet of master 305 is connected to submaster 311 by line 302. The pressure outlet of submaster 311, which is a function of the temperature difference between the housing 29 and the bed plate 20, is connected by line 313 to valve 114 which controls the flow of coolant through heat exchanger 81 associated with housing 29.

In the specification and claims, the term "associated portions," or "associated members," is used to indicate portions of the machine tool which should be precisely positioned relative to each other to produce accurate work.

What is claimed is:

1. In a machine tool having two associated portions subjected to heat generated by the operation of the machine and having a third portion, means at each of said associated portions to sense the temperature thereof, means at said third portion to sense the temperature thereof, means responsive to the temperature at the third portion and the temperature at one of said associated portions to control the temperature of said one of said associated portions, and means responsive to the temperature at the other of said associated portions and the temperature of one of the other portions to control the temperature of said other associated portion.

2. In a machine tool having two associated portions subjected to heat generated by the operation of the machine and having a third portion, means at each of said associated portions and at said third portion to sense the respective temperatures thereof, heat transfer means associated with each of said two associated portions, thermostatic means responsive to the temperature difference between one of said associated portions and said third portion to control the heat transfer means associated with said one associated portion to maintain a predetermined temperature relation between said one associated portion and said third portion, and thermostatic means responsive to the temperature difference between the other of said associated portions and said third portion to control the heat transfer means associated with said other of said associated portions to maintain a predetermined temperature relation between said other of said associated portions and said third portion.

3. In a machine tool, in combination, a member adapted to receive a cutting tool, a member adapted to support a workpiece, both of said members being subjected to heat generated during operation, a base having a portion spaced from said members, said portion having a temperature defining a reference temperature, means at each of said members and at said base portion to sense the respective temperatures thereof, heat transfer means associated in heat transfer relation with said tool receiving member, thermostatic means responsive to the difference between the temperature of the tool receiving member and the reference temperature to control the heat transfer means associated with said tool receiving member, heat transfer means associated in heat transfer relation with said workpiece supporting member, and thermostatic means responsive to the difference between the temperature of the workpiece supporting member and the reference temperature to control the heat transfer means associated with said workpiece supporting member.

4. In a machine tool, in combination, a member adapted to receive a cutting tool, a member adapted to support a workpiece, said members being subjected to heat generated during operation of the machine capable of producing temperatures therein fluctuating in different amounts, a base having a portion with a temperature defining a reference temperature, said portion spaced from said members and relatively unaffected by heat generated during operation of the machine, heat transfer means associated in heat transfer relation with said tool receiving member, means at said base portion to sense the reference temperature, means at the tool receiving member to sense the temperature thereof, means responsive to the temperature sensing means at the base portion and the temperature sensing means at the tool receiving member to regulate the heat transfer means associated with said tool receiving member to bring the temperature thereof into a predetermined relation with the reference temperature, heat transfer means associated in heat transfer relation with said workpiece supporting member, means at the workpiece supporting member to sense the temperature thereof, means responsive to the temperature sensing means at the base portion and the temperature sensing means at the workpiece supporting member to regulate the heat transfer means associated with said workpiece supporting member to bring the temperature thereof into a predetermined relation with the reference temperature, and means to indicate when a predetermined temperature relation between said members has been established.

5. A mechanism according to claim 4 in which said indicating means is a signal and having means controlled by said signal to disable the machine tool when the temperature difference between the tool carrying member and the workpiece supporting member departs from said predetermined relation.

6. In a machine tool, in combination, a member adapted to receive a cutting tool, a member adapted to support a workpiece, said members being subjected to heat generated during operation of the machine capable of producing temperatures therein fluctuating in different amounts, a base having a portion with a temperature defining a reference temperature, said portion spaced from said members and relatively unaffected by heat generated during operation of the machine, a source of heat exchanging medium, a first heat exchanger, means to circulate heat exchanging medium through the first heat exchanger and into heat transfer relation with said tool receiving member, means at said base portion to sense the reference temperature, means at the tool receiving member to sense the temperature thereof, means responsive to the sensing means at the base portion and at the tool receiving member to regulate the flow of heat exchanging medium through the first heat exchanger to bring the temperature of the tool receiving member into a predetermined relation with the reference temperature, a second heat exchanger, means to circulate heat exchanging medium through the second heat exchanger and into heat transfer relation with said workpiece supporting member, means at the workpiece supporting member to sense the temperature thereof, means responsive to the temperature sensing means at the base portion and at the workpiece supporting member to regulate the flow of heat exchanging medium through the second heat exchanger to bring the temperature of the workpiece supporting member into a predetermined relation with the reference temperature, and means responsive to the temperature differences between said members and the reference temperature to produce a signal when a predetermined temperature relation between said members has been established.

7. In a machine tool, in combination, a member adapted to receive a cutting tool, a member adapted to support a workpiece, one of said members being rotatable to generate heat during operation of the machine tool incident to said rotation and the other of said members being subjected to heat generated during operation, a housing having a compartment therein to support said rotating member, a base having a portion with a temperature defining a reference temperature, said portion spaced from said members and relatively unaffected by heat generated during operation of the machine, the temperature of said portion being influenced primarily only by room temperature, a source of heat exchanging medium, a first heat exchanger, means to circulate heat exchanging medium through the first heat exchanger and through the compartment of the housing supporting said rotating member, means at said base portion to sense the reference temperature, means at the housing to sense the temperature thereof, means responsive to the sensing means at the base portion and at the housing to regulate the flow of heat exchanging medium through the first heat exchanger to bring the temperature of the housing into a predetermined relation with the reference temperature, a second heat exchanger, means to circulate heat exchanging medium through the second heat exchanger and into heat transfer relation with said other member, means at said other member to sense the temperature thereof, means responsive to the temperature sensing means at the base portion and at said other member to regulate the flow of heat exchanging medium through the second heat exchanger to bring the temperature of the other member into a predetermined relation with the reference temperature, and means responsive to the temperature difference between said members and the reference temperature to produce a signal when a predetermined temperature relation between said members has been established.

8. In a machine tool, in combination, a rotatable member in which heat is produced incident to the operation of the machine tool, a second member positioned relative to said rotating member for accurate operation of the machine tool when a predetermined temperature difference exists between said members, a member having a portion spaced from said rotating member and relatively unaffected by heat produced incident to the operation of the machine tool, said portion having a reference temperature, means to maintain the temperature of said second member equal to the reference temperature, means to bring the temperature of the rotating member to a temperature a predetermined amount above the reference temperature, and means to indicate when the temperature of the rotating member is said predetermined amount above the temperature of the second member.

9. In a machine tool, in combination, a pair of associated members subjected to heat during operation, one of said members positioned relative to the other for accurate operation of the machine tool when a predetermined temperature relation exists between said members, the machine having a base portion spaced from said members and affected primarily only by room temperature, means at said members and at said base portion to sense the respective temperatures thereof, heat transfer means associated with each of said associated members, means responsive to the temperature at the base portion and the temperature at one of said members to control the heat transfer means associated with said one member, and means responsive to the temperature at said one member and the temperature at the other member to control the heat transfer means associated with said other member.

10. The method of controlling the temperature of a machine tool during operation comprising the steps of measuring the temperature at associated portions subjected to heat generated incident to the operation of the machine tool, measuring the temperature at a portion of the base relatively unaffected by heat generated during operation and affected primarily only by room temperature, controlling the temperature of each of the portions affected by the heat generated during operation by heat transfer means to maintain the temperature of each of said portions in predetermined relation with the temperature of said portion of the base.

11. The method of performing an accurate forming operation on a workpiece in a machine tool having associated portions relatively positioned for accurate forming when a predetermined temperature difference exists between said portions, one of said portions supporting a cutting tool and the other of said portions supporting a workpiece, and having a base having a portion relatively unaffected by heat generated during operation of the machine tool, the machine tool having heat transfer means associated with the portion supporting the cutting tool and heat transfer means associated with the portion supporting the workpiece, the method comprising the steps of measuring the temperatures at the associated portions and at the base portion, regulating the heat transfer means associated with the portion supporting the cutting tool to bring the temperature thereof into a predetermined relation with the temperature of said portion of the base, regulating the heat transfer means associated with the portion supporting the workpiece to bring the temperature thereof into a predetermined relation with the temperature of said portion of the base, measuring the temperature difference between said portions, and engaging the cutting tool with the workpiece only after said predetermined difference has been established.

12. The method of performing an accurate forming operation on a workpiece supported in a machine tool comprising the steps of measuring the temperatures at associated portions subjected to heat generated during operation, measuring the temperature of a portion of the machine relatively unaffected by generated heat, regulating the temperatures of members of the machine tool subjected to heat during operation to maintain the temperatures thereof in predetermined relation to the temperature of said portion of the machine relatively unaffected by heat produced by the operation, measuring the temperature difference between said members, and performing the forming operation after the temperature difference between said members reaches a predetermined amount.

13. The method of controlling the temperature of a machine tool during operation comprising the steps of measuring the temperature at associated portions of the machine subjected to heat generated incident to the operation thereof, measuring the temperature at a portion of the machine spaced from said associated portions, circulating heat transfer medium about one of said associated portions to bring the temperature thereof into predetermined relation with the temperature of the portion spaced from the portions subjected to heat, and circulating heat transfer medium about the other of said associated portions to bring the temperature of said other portion into predetermined relation with the said one portion.

References Cited in the file of this patent

UNITED STATES PATENTS

| | | |
|---|---|---|
| 2,384,809 | Bullard et al. | May 21, 1942 |
| 2,516,750 | Brower | Jan. 11, 1949 |
| 2,606,747 | Williams | Aug. 12, 1952 |
| 2,967,694 | Cunningham | Jan. 10, 1961 |

FOREIGN PATENTS

| | | |
|---|---|---|
| 1,013,941 | Germany | Aug. 14, 1957 |

UNITED STATES PATENT OFFICE
CERTIFICATE OF CORRECTION

Patent No. 3,066,578                            December 4, 1962

Peter F. Olton

It is hereby certified that error appears in the above numbered patent requiring correction and that the said Letters Patent should read as corrected below.

Column 6, line 69, for "coil" read -- oil --.

Signed and sealed this 16th day of July 1963.

(SEAL)
Attest:

ERNEST W. SWIDER
Attesting Officer

DAVID L. LADD
Commissioner of Patents